(12) United States Patent
Staszewski (10) Patent No.: US 6,636,572 B1
(45) Date of Patent: Oct. 21, 2003

(54) HIGH-SPEED DIGITAL TIMING AND GAIN GRADIENT CIRCUIT EMPLOYING A PARALLEL ARCHITECTURE

(75) Inventor: Robert B. Staszewski, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/256,420

(22) Filed: Feb. 24, 1999

(51) Int. Cl.[7] .............................. H04L 7/00; H03M 1/62; G06F 17/10
(52) U.S. Cl. ..................... 375/354; 341/139; 708/319
(58) Field of Search ............................... 375/354, 357, 375/364, 368, 377, 371, 373, 376, 366, 263, 362; 360/51, 65, 46; 331/17, 18; 708/319, 300, 301, 315, 316, 322, 323; 341/139, 123, 122

(56) References Cited

U.S. PATENT DOCUMENTS

| | | | | |
|---|---|---|---|---|
| 4,355,284 A | * | 10/1982 | Acker | ................ 327/233 |
| 4,980,860 A | * | 12/1990 | Houston et al. | ........ 365/189.11 |
| 5,341,387 A | * | 8/1994 | Nguyen | ...................... 375/341 |
| 6,111,531 A | * | 8/2000 | Farag | ........................ 341/143 |
| 6,191,716 B1 | * | 2/2001 | Staszewski | ................. 341/123 |

* cited by examiner

*Primary Examiner*—Khai Tran
(74) *Attorney, Agent, or Firm*—W. Daniel Swayze, Jr.; W. James Brady; Frederick J. Telecky, Jr.

(57) ABSTRACT

A system and a method for implementing a feedback control signal by employing parallel paths (105 and 106) for processing separate parts of the signal. The method effectively doubles operating speed of the feedback circuit by providing two processing paths (101 and 102). Where two paths are used, each operates at approximately one-half of the data rate of the incoming data signal (516). The method also lends itself to processing in those applications where more than one mode is used. For example, when used in a read channel (513) of a disk drive (500), three modes are desired: FIR-bypass (201), acquisition (202), and data-tracking (203). Being able to switch easily among the three modes of the system (200) provided for in a read channel of a disk drive (500) demonstrates the adaptability of the method and supporting structure to a broad class of feedback circuits used in systems employing high throughput rates.

3 Claims, 6 Drawing Sheets

HIGH-SPEED DIGITAL TIMING AND GAIN GRADIENT CIRCUIT EMPLOYING A PARALLEL ARCHITECTURE

FIELD OF THE INVENTION

The present invention relates to a system and a method for increasing throughput rate of a signal processor. In particular, it provides a system and method for parallel processing of a digital feedback signal using a high-speed gradient circuit such as a timing or gain gradient circuit, or both.

BACKGROUND

A "digital signal" is a signal that conveys a discrete number of values at discrete times. Contrast the "analog signal," i.e., a signal that conveys an infinite number of values on a time continuum. A signal having a digital form may be generated from an analog signal through sampling and quantizing the analog signal. Sampling an analog signal refers to "chopping" the signal into discrete time periods and capturing an amplitude value from the signal in selected ones of those periods. The captured value becomes the value of the digital signal during that sample period. Such a captured value is referred to as a sample.

Quantizing refers to approximating a sample with a value that may be represented on a like digital signal. For example, a sample may lie between two values characterized upon the digital signal. The value nearest (in absolute value) to the sample may be used to represent the sample. Alternatively, the sample may be represented by the lower of the two values between which the sample lies. After quantization, a sample from an analog signal may be conveyed as a digital signal. This is the resultant signal upon which the digital circuit may operate.

A digital signal processor (DSP) transforms an input digital signal to an output digital signal. For the digital filter, the transformation involves filtering out undesired portions of the received digital signal. An original analog signal may be represented as a sum of a plurality of sinusoids. Each sinusoid oscillates at a particular and unique frequency. Filtering is used to remove certain frequencies from an input signal while leaving other frequencies intact.

Programs executing on digital circuits often do so in "real-time." Real-time programs are programs that must execute within a certain time interval. Regardless of whether a program executes in a large period of time or a small period of time, the result of executing the program is the same. However, if real-time programs attempt to execute in an amount of time longer than the required time interval, then they no longer will compute the desired result.

Programs executing on a digital circuit are real-time programs in that the instructions are manipulating a sample of a digital signal during the interval preceding the receipt of the next sample. If the program cannot complete manipulating a sample before the next sample is provided, then the program will eventually begin to "lose" samples. A lost sample does not get processed, and therefore the output signal of the digital circuit no longer contains all of the information from the input signal provided to the digital circuit. This potential for losing samples is reduced by a preferred embodiment of the present invention, while maintaining a required throughput rate.

A digital circuit may be programmed to modify signals. The number of instructions required to do this is relatively fixed. A digital circuit must be capable of executing this relatively fixed number of instructions on any given sample before the next sample of the series is provided.

Besides considering a digital circuit's throughput, all design parameters have an associated cost. One important cost factor is the silicon area needed to "house" the digital circuit. Those that are manufactured on a relatively small silicon chip are less expensive than those requiring a large chip. Therefore, an easily manufacturable, small (low cost) digital circuit is desirable.

Some features of digital circuits that are important to the design engineer include phase characteristics, stability, and coefficient quantization effects. To be addressed by the designer are concerns dealing with finite word length and circuit performance. order than a generic Nyquist filter to implement the required shape factor. DIGITAL FIR filters are subject to non-negligible inter-symbol interference (ISI), however.

Coefficient quantization error occurs as a result of the need to approximate the ideal coefficient for the "finite precision" processors used in real systems. Quantization error sources due to finite word length include:

a) input/output (I/O) quantization,
b) filter coefficient quantization,
c) uncorrelated roundoff (truncation) noise,
d) correlated roundoff (truncation) noise, and
e) dynamic range constraints.

Input noise associated with the analog-to-digital (A/D) conversion of continuous time input signals to discrete digital form and output noise associated with digital-to-analog conversion are inevitable in digital filters. Uncontrolled propagation of this noise is not inevitable, however.

Uncorrelated roundoff errors most often occur as a result of multiplication errors. For example, in attempting to maintain accuracy for signals that are multiplied, only a finite length can be stored and the remainder is truncated, resulting in "multiplication" noise being propagated. Obviously, any method that minimizes the number of multiplication steps will also reduce noise and increase inherent accuracy.

Correlated roundoff noise occurs when the products formed within a digital filter are truncated. These include the class of "overflow oscillations." Overflows are caused by additions resulting in large amplitude oscillations. Correlated roundoff also causes "limit-cycle effect" or small-amplitude oscillations. For systems with adequate coefficient word length and dynamic range, this latter problem is negligible. However, both overflow and limit-cycle effects force the digital filter into non-linear operation. Both of these latter constraints are addressed by a preferred embodiment of the present invention.

Constraints to dynamic range, such as scaling parameters, are used to prevent overflows and underflows of finite word length registers. For a digital circuit, an overflow of the output produces an error. If the input has a maximum amplitude of unity, then worst case output is:

$$y(n) = \sum_{n=0}^{N-1} x(n) = s \qquad (1)$$

where:
s=scaling factor
x(n)=input sample value at n
y(n)=output sample value at n Guaranteeing y(n) is a fraction means that either the circuit's gain or the input has to be scaled down by "s." Reducing gain implies scaling the digital filter's coefficients, for example, to the point where a 16-bit coefficient, for example, would no longer be used efficiently. Another result of this scaling is to degrade frequency response due to high quantization errors. A better alternative is to scale the input signal. Although this results in a reduction in signal-to-noise ratio (SNR), the scaling factor used is normally <2, not altering the SNR drastically. Systems employing circuits requiring use of reduced bandwidth are less susceptible to degradation of the SNR. This is also addressed by a preferred embodiment of the present invention.

A typical example of a high-speed digital circuit is a digital FIR filter with five or more coefficients known as a Type II FIR. A Type II FIR filter is based on an array of costly Multiply and Add (MAC) accumulation stages. A conventional system using MAC is constrained to a minimum number of gates to achieve a given partial product accuracy. Digital implementation of an FIR filter is also limited by the maximum number of logic gates that can be inserted between reclocking stages established by the filter's clock cycle. Thus, for a given digital process, a minimum time to process is established by the propagation time through the critical path. To achieve very high speeds of processing, the critical path is broken into a number of shorter paths that can be addressed at higher clock speeds, i.e., processed within a short clock cycle. A preferred embodiment of the present invention implements an alternative using parallel processing including parallel processing of a de-interleaved signal in a feedback control circuit.

In magneto-resistive (MR) heads, with their inherent response nonlinearities, this throughput constraint is becoming even more unacceptable. There are more modern methods that achieve a fully digital solution, but these are extremely complex while covering a disproportionately large area on a silicon chip.

For those data streams that have a high dynamic range, a method involving splitting the sampled input signal into two portions and addressing each separately in separate filters has been proposed. Of course, this doubles the number of operations and the hardware required.

To reduce hardware complexity and computational intensity for relatively low-speed applications, such as modems, cascaded arrangements of data registers receive digitally encoded data and sequentially clock the samples. Each data register has a data capacity greater than twice the code width of a digitized sample, permitting each channel to store both I and Q data. Because the data capacity need be greater than twice the input, the data rate of devices with which this can be used is relatively low.

Some of the above introduce additional complexity not required in the preferred embodiments of the present invention while others may not be suitable for high-speed applications.

In a magnetic disk data storage system, for example, information is recorded by inducing a pattern of magnetic variations on the disk, thus encoding the information. The magnetic variations are recorded along concentric circular tracks on the disk. The linear density with which the magnetic flux changes may be recorded along a track as well as the radial density of tracks on the disk is ever increasing.

As the recording density is increased, however, the magnetic readback signal from the disk becomes more and more difficult to read and interpret due in part to inter-symbol interference (ISI). ISI results from process-time overlaps and the reduced spacing between neighboring magnetic flux patterns along an individual track as well as between those on adjacent tracks. For drives with interchangeable disks, in particular, each disk may introduce its own irregularities into the readback signal due to naturally occurring variations within manufacturing tolerances. Moreover, the irregularities are not uniform even over an individual disk, but depend to some degree on radial position.

Increased data density has prompted the use of digital signal processing techniques to extract data from noisy, distorted or otherwise irregular readback signals. In one commonly used technique, a sequence of consecutive raw data samples read from the disk is passed through a filter that continuously monitors the expected error in the signal and corrects data accordingly. A popular class for this purpose comprises the adaptive FIR filters.

These filters provide time-varying signal processing that adapts signal characteristics, in real time, to a sensed error measure. The characteristics are defined by time-varying coefficients, the values of which are adjusted at regular intervals, again in real time, in order to minimize cumulative error.

An adaptive FIR filter may be thought of as having two parts: a filter structure that uses coefficients to modify data, and an adaptation circuit that updates the values of the coefficients. Existing implementations of filter structures and adaptation circuits are subject to design compromises.

The dynamic power dissipated in conventional filter circuit implementations (assuming the use of CMOS ICs) is given by the relationship:

$$P \propto C \times V^2 \times f \times N_{Gate} \qquad (2)$$

where:
C=the average loading capacitance of a gate in the IC chip,
V=the power supply voltage level,
f=the operating frequency, and
$N_{gats}$=the number of gates that are switching at frequency, f.

Improved performance is generally realized with a higher operating frequency,f, but comes at the expense of higher power dissipation levels.

From Eqn. (2), power consumption also increases in proportion to the number of gates. A common IC embodiment of FIR filters is a tapped delay line, in which each of the coefficients characterizing the filter corresponds to a separate "tap" along a delay line. The number of gates goes up in proportion to the number of taps. The number of taps dictates the overall time delay for data to pass through the filter and thus limits the operating frequency (data rate). To compensate for this delay, data pipelining is introduced to increase the FIR filter's operating frequency and the effective system throughput. However, pipelining calls for more gates, resulting in even greater power consumption. This constraint is also addressed by a preferred embodiment of the present invention wherein taps are shared in parallel paths. This parallelism is not only evident in the FIR filter, for example, but also in synchronization circuits associated with the system, such as timing recovery circuits and AGC circuits.

In addition to the power demand, conventional FIR filter coefficient adaptation circuits, for example, can introduce a bottleneck. To provide updated filter coefficients in successive clock cycles as new data are clocked through, conventional adaptation circuits require computations to be performed within a single bit clock cycle of the input signal. This makes it difficult to increase the overall speed of the data detection system as a whole and limits the circuitry and algorithms that may be employed for updates. A preferred embodiment of the present invention addresses this "single bit clock of the input signal" cycle constraint in all parts of the circuit, including feedback control.

Existing filter adaptation circuits also experience updated coefficients that wander from optimal when the coefficient adaptation process is operated simultaneously with a "decision-directed" timing recovery loop. This prevents consistent convergence to optimal values and impedes the performance. A preferred embodiment of the present invention also addresses this constraint.

A "pipelining" method is normally used to achieve better filter performance at high input data rates. The cost of using this method is increased latency, however. At very high speeds, such as are being seen with newer systems, conventional pipelining falls subject to the law of diminishing returns. The pipelining "overhead" now consumes a larger percentage of the benefits gained from higher clock speeds. The overhead consists of a required latching or reclocking stage for every pipelining command. Generally, the performance improvement for one level of pipelining is less than two while the "on-chip" cost increase is greater than two. All the while this is occurring at the very high clock rate of the input data. A preferred embodiment of the present invention addresses the clock rate limitation imposed by a high data rate input signal, in particular during feedback control operations.

SUMMARY

A preferred embodiment of the present invention provides a system and method for increasing the speed of operation of a digital circuit using a high-speed gradient circuit, such as a timing or gain gradient circuit. By providing parallel paths for operation, without appreciably increasing "on-chip" real estate.

This allows the remaining portions of a functional circuit, such as a read channel circuit of a mass data storage device, to be upgraded since those "primary" portions no longer depend on "slow" timing recovery or AGC, for example.

Processing feedback data in parallel paths enables cutting clock speed in half, providing twice as much time for processing each bit in the timing recovery loop or AGC. Further it also enables a timing or gain gradient calculator, also processing in parallel paths, as described in U.S. patent application Ser. No. 09/256,568, Attorney's Docket No. TI-28614 and incorporated herein by reference, to control the timing recovery circuit. By having each path of the parallel circuits operate at half the input data rate and providing for certain operations to be made common to each path, as described supra, required on-chip area is also reduced compared to conventional timing recovery circuits of comparable performance.

A preferred embodiment of the present invention is implemented for use by a timing recovery circuit by de-interleaving the digital output signal from a digital circuit into two separate bit streams, one containing the EVEN bits and the other containing ODD bits. (The terms ODD and EVEN are used to connote alternate bits and have no relation, except accidental, to either the position of the bits in a sequence or to any numeric value that may be assigned to the bits.) In a preferred embodiment of the present invention, the signal that is being processed within a timing recovery loop or an AGC circuit has been previously encoded in a partial response (PR) architecture for further processing in a maximum likelihood (ML) detector, such as a Viterbi Detector.

Figures 2, 2A:
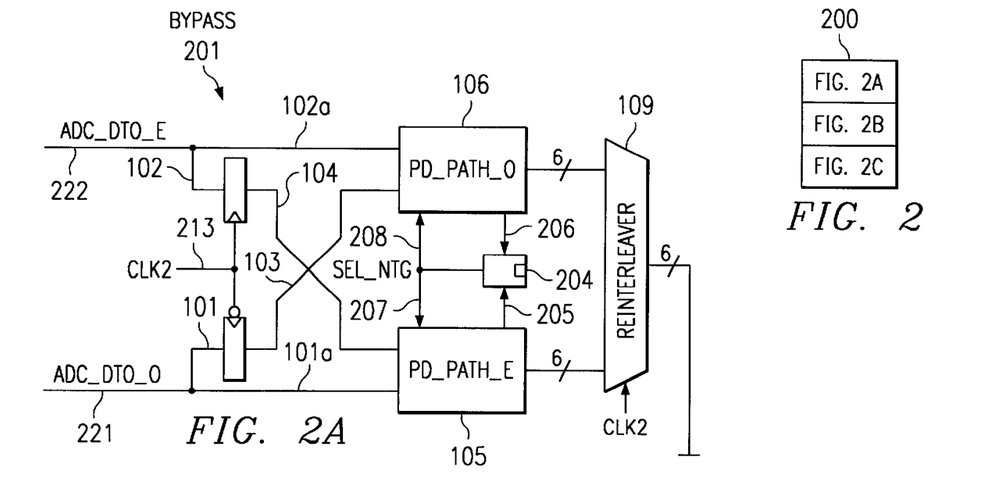
Figure 2B:
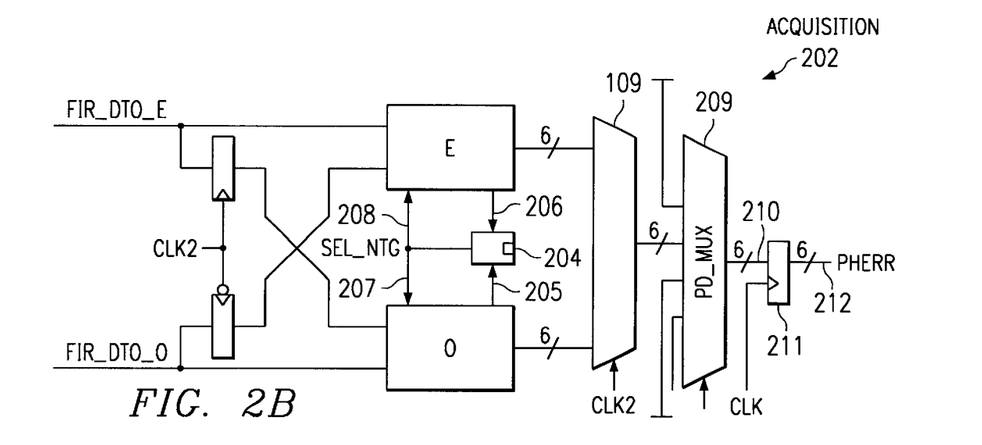
Figure 2C:
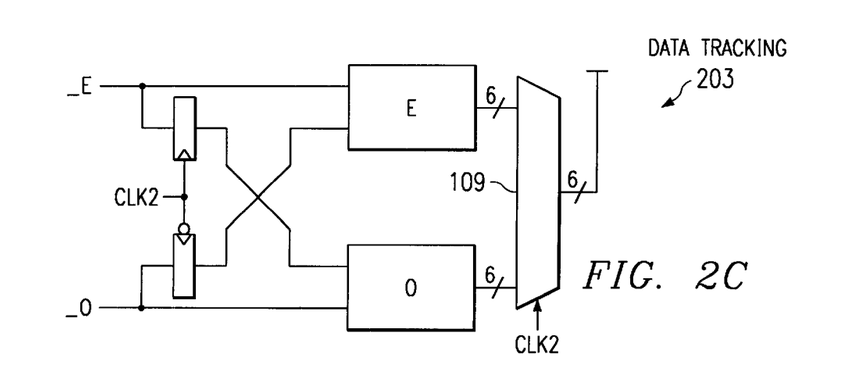

Referring to FIG. 2, a clock signal (not shown in FIG. 2) is provided from a timing recovery loop (not shown) to insure that the "samples" are being taken at the appropriate instance for the chosen encoding format. A processing period of 2T, where T is the clock rate of input data signal (not shown), is made available by processing odd bits on the "rising edge" of the clock signal along paths 101 and 101a FIG. 2. Of course, the opposite is the case for the even bits processed on the "falling edge" of the clock signal at along paths 102 and 102a FIG. 2. The taps 103 and 104 FIG. 2 can be configured using simple latches (not shown) and incorporate a multiply and accumulate (MAC) function for each tap. This alternating processing of even and odd bits on two different paths and at opposite edges of a clock signal provides the 2T processing period that differentiates a preferred embodiment of the present invention from existing designs.

Some of the salient advantages of the present invention are that it:

significantly increases throughput.

reduces required silicon area on the chip, considering the performance improvement.

reduces overhead.

reduces latency.

reduces fabrication cost.

uses a clock speed that is half the input data rate.

cross-references operations for each path.

BRIEF DESCRIPTION OF DRAWINGS

FIG. 1b is a timing sequence of a preferred embodiment as depicted in FIG. 1a.

FIG. 2 is a block diagram of an application of FIG. 1a.

DETAILED DESCRIPTION OF THE PREFERRED EMBODIMENTS

Figure 1A:
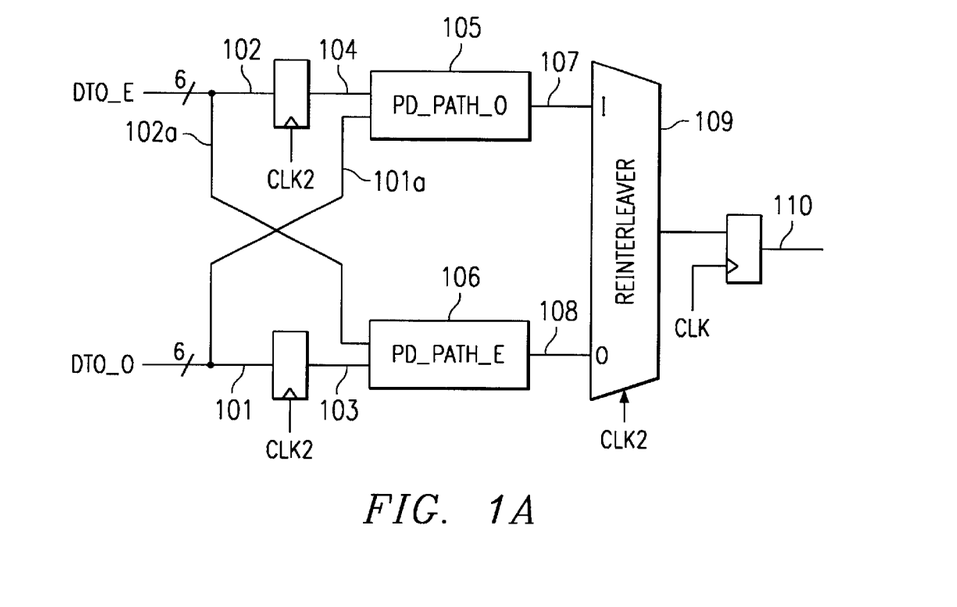
FIG. 1a is a block diagram of a representative parallel structure of a preferred embodiment showing the outer parallelism and combinatorial logic processors.

FIG. 1a provides a simple block diagram of a preferred embodiment of the present invention. The 6-bit digital input has been de-interleaved (the de-interleaver is not shown in FIG. 1a) just prior to inputting to the two paths 101 and 102 as ODD and EVEN bit streams, respectively. FIG. 1a depicts the "outer parallelism" only, i.e., showing the alternating ODD and EVEN bit streams of the input signals DTO__O and DTO__E as provided to separate paths 101 and 102 as well as to 101a and 102a. Those signals provided to paths 101 and 102 are clocked at 2T, where T is the bit clock period of input data.

After additional re-clocking at 2T, the ODD and EVEN bit streams are transmitted over paths 103 and 104 FIG. 1a, respectively for processing in combinatorial logic processors PD_PATH_E 106 and PD_PATH_O 105 FIG. 1a, respectively. At the same time the ODD and EVEN bit streams, clocked at the full period 2T, are provided to "opposing" processors PD_PATH_O 105 and PD_PATH_E 106 FIG. 1a over paths 101a and 102a FIG. 1a, respectively. PD PATH_O 105 now has the ODD bit stream to process before the falling edge of CLK2 213 FIG. 2 and the EVEN bit stream to process before the rising edge of CLK2. Conversely, PD_PATH_E 106 FIG. 1a now has the EVEN bit stream to process at period T and the ODD bit stream to process at 2T. After processing in the combinatorial logic 105 and 106 FIG. 1a, the bit streams are fed over paths 107 (from PD_PATH_O 105) FIG. 1a and 108 (from PD_PATH_O 106) FIG. 1a to re-interleaver 109 FIG. 1a, that is switched by the 2T clock (not shown). The output from the re-interleaver is then re-clocked to a period T along path 110 FIG. 1a.

Figure 1B:
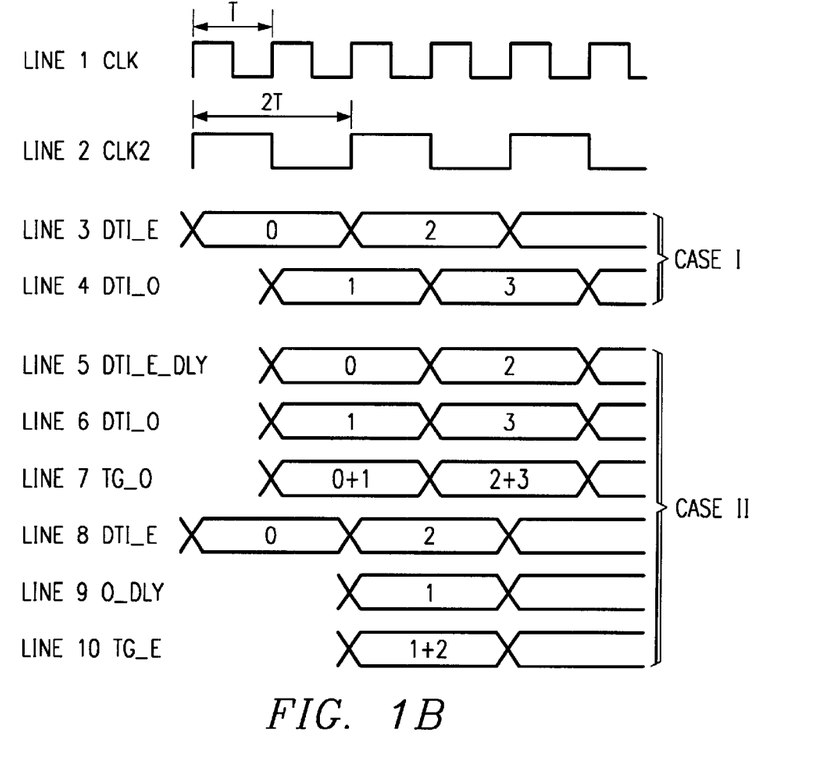

FIG. 1b shows the timing sequence for the signal processing depicted in FIG. 1a. Line 1 of FIG. 1b shows the "bit" clock period T. Line 2 of FIG. 1b shows the 2T-clock period to be used with select paths (101 and 102) FIG. 1a of the ODD and EVEN bit streams as well as at the re-interleaver 109 FIG. 1a.

Lines 3 and 4 of FIG. 1b show "Case I" in which EVEN bits are clocked on the rising edge of a 2T clock Line 3 FIG. 1b and ODD bits are clocked on the falling edge of the same 2T clock Line 4 FIG. 1b.

Lines 5 through 10 of FIG. 1b show "Case II." EVEN bits are shifted (delayed as signal DTI_E_DLY Line 5 of FIG. 1b) by period T to coincide with ODD bits (signal DTI_O Line 6 of FIG. 1b) in PD_PATH_O 105, resulting in the signal (bits 0+1 and 2+3) TG shown in Line 7 of FIG. 1b. Conversely, ODD bits are shifted (delayed as signal O_DLY Line 9 of FIG. 1b) by period T to coincide with EVEN bits (signal DTI_E Line 8 of FIG. 1b) in PD_PATH_E 106, resulting in the signal covering bits 0 +1 and 2 +3 TG_E shown in Line 10 of FIG. 1b. Note that the signal TG_E in Line 7 of FIG. 1b precedes that of the signal of Line 10 of FIG. 1b by period T.

FIG. 2 shows the three modes 201, 202 and 203 in which a preferred embodiment of the present invention may operate. Note that all three are programmable and time independent in a preferred embodiment of the present invention.

At the top of FIG. 2 is a block diagram of FIR-bypass mode 201. In this mode the filter is bypassed and input signals ADC_DTO_O 221 FIG. 2 and ADC_DTO_E 222 in FIG. 2 are de-interleaved signals representing output of the analog-to-digital converter (ADC) (not shown in FIG. 2). The operation is somewhat different from that of FIG. 1a in that the controller 204 provides signal SEL_NTG containing data leading to selection of the "closer to zero" value on paths 207 and 208, respectively, as fully described in U.S. patent application Ser. No. 09/258,827 Attorney's Docket No. TI-28620, incorporated herein by reference to the processors PD_PATH_O 105 and PD_PATH_E 106 FIG. 2 after receiving input from the processors on paths 205 and 206 FIG. 2, respectively. This controller enable selection of the native timing gradient in those applications where more than one PRML architecture is available for implementation. The right hand portion of FIG. 2 will be described in detail below after each mode 201, 202, and 203 has been described.

In the middle of FIG. 2 is depicted a block diagram of "acquisition" mode 202. In this mode, the recovery circuit supports that part of signal processing during which the preamble, a sinusoid in a preferred embodiment of the present invention, is being acquired. The left most portion of this block diagram 202 is identical to FIG. 1a with the exception of the controller as described above for FIR-bypass mode.

At the bottom of FIG. 2 is depicted the data-tracking mode 203 in which the actual digital data signal is tracked and adjusted in phase and frequency, for example. The left-hand side of 203 in FIG. 2 is identical in function to that of FIG. 1a. The output for each mode 201, 202 and 203 is provided to multiplexer 209 of FIG. 2 (still switched at period 2T) from which an output signal PD_MUX is provided on path 210 to a register 211 where PD_MUX is re-clocked at period T and output on path 212 as signal PHERR (phase error). In a preferred embodiment of the present invention signal PHERR is provided to a timing recovery loop or phase-locked loop (PLL) over path 212 for final transmittal to, and adjustment of, the ADC (not shown in FIG. 2).

Figure 3:
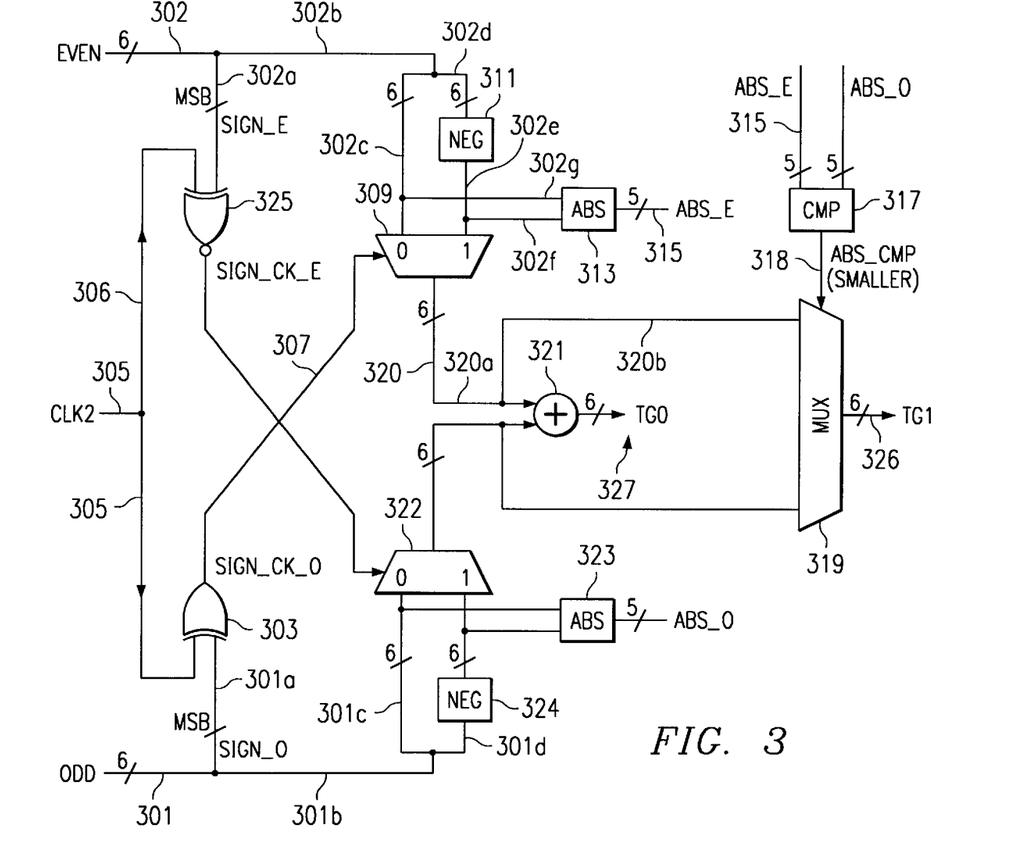
FIG. 3 is a detailed diagram of the "FIR-bypass" mode of FIG. 2.

FIG. 3 provides a more detailed block diagram of the lower level block FIR-bypass mode illustrated at 201 of FIG. 2. In a preferred embodiment of the present invention shown in FIG. 3, the input data is a 6-bit digital signal de-interleaved as explained above. The input data has no most negative bit (−32 for 6-bit data) so that negation as well as the positive values will be limited to 6 bits. The reasoning behind using a simpler 6-bit unsigned signal at this stage of processing is fully detailed in U.S. patent application Ser. No. 09/322,671 and U.S. Pat. No. 6,191,716 Attorney's Docket No. TI-28902 incorporated herein by reference.

The ODD bit stream is provided over path 301 FIG. 3 and the most significant bit (MSB) of the ODD bit stream is provided as signal SIGN_O over path 301a FIG. 3 to XOR gate 303 FIG. 3 where it is joined by a clock signal CLK2 FIG. 3 provided on path 305 FIG. 3 to XOR gate 303 FIG. 3. Signal CLK2 FIG. 3 is a timing signal provided at period 2T where T is the period of the bit rate of the input signal to be processed, for example, the input from the read head of a disk drive provided to a read channel circuit 516 of FIG. 5. The output of XOR gate 303 FIG. 3 is signal SIGN_CK_O provided over path 307 FIG. 3 to a simple 2-way (i.e., −1 is not available) multiplexer 309 FIG. 3. Multiplexer 309 also receives input over paths 302, 302b and 302c FIG. 3 of the original EVEN bit stream. As well, multiplexer 309 FIG. 3 receives the same original EVEN bit stream over paths 302, 302b, 302d and 302e FIG. 3 after negation at NEG 311 FIG. 3. Further, in a preferred embodiment, the negated bit stream is also provided over path 302f FIG. 3 to an absolute value circuit 313 FIG. 3 where it is compared with the original EVEN bit stream transmitted over path 302g FIG. 3 to absolute value circuit 313 FIG. 3. The output signal ABS_E of absolute value circuit 313 FIG. 3 is a 5-bit signal provided over path 315 FIG. 3 to comparator 317 FIG. 3 in which the smaller of two values is selected for output as signal ABS_CMP on path 318 FIG. 3. ABS_CMP is the signal that results from comparing two other input signals (described below and more fully in U.S. patent application Ser. No. 09/247,131 and U.S. Pat. No. 6,252,733 Attorney's Docket No. TI-27839, incorporated herein by reference) and selecting the smaller in multiplexer 319 FIG. 3 and output as signal TG1 from which it is potentially provided to a timing recovery loop or PLL (not shown in FIG. 3) for adjustment of the sampling phase (not shown in FIG. 3).

Signals input to multiplexer 309 are processed and output as a 6-bit signal on paths 320 and 320a FIG. 3 to summer 321 FIG. 3 and on paths 320 and 320b FIG. 3 to multiplexer 319 FIG. 3. From summer 321 FIG. 3 6-bit output signal TG0 is potentially provided to a timing recovery loop or PLL (not shown in FIG. 3) for adjustment of the sampling phase (not shown in FIG. 3).

The EVEN bit stream input is handled in a "mirror" fashion (noting that there is an XOR gate 325 used in the mirror half) to that of the ODD bit stream input described as above, providing "the other half" of inputs to multiplexer 322 FIG. 3 and 309 FIG. 3, NEG 324 FIG. 3, absolute value circuit 323 FIG. 3, summer 321 FIG. 3, comparator 317 FIG. 3, and multiplexer 319 FIG. 3. Note that outputs TG0 and TG1 FIG. 3 are "raw" timing gradients that are amplitude dependent, each having different gain values.

Figure 4:
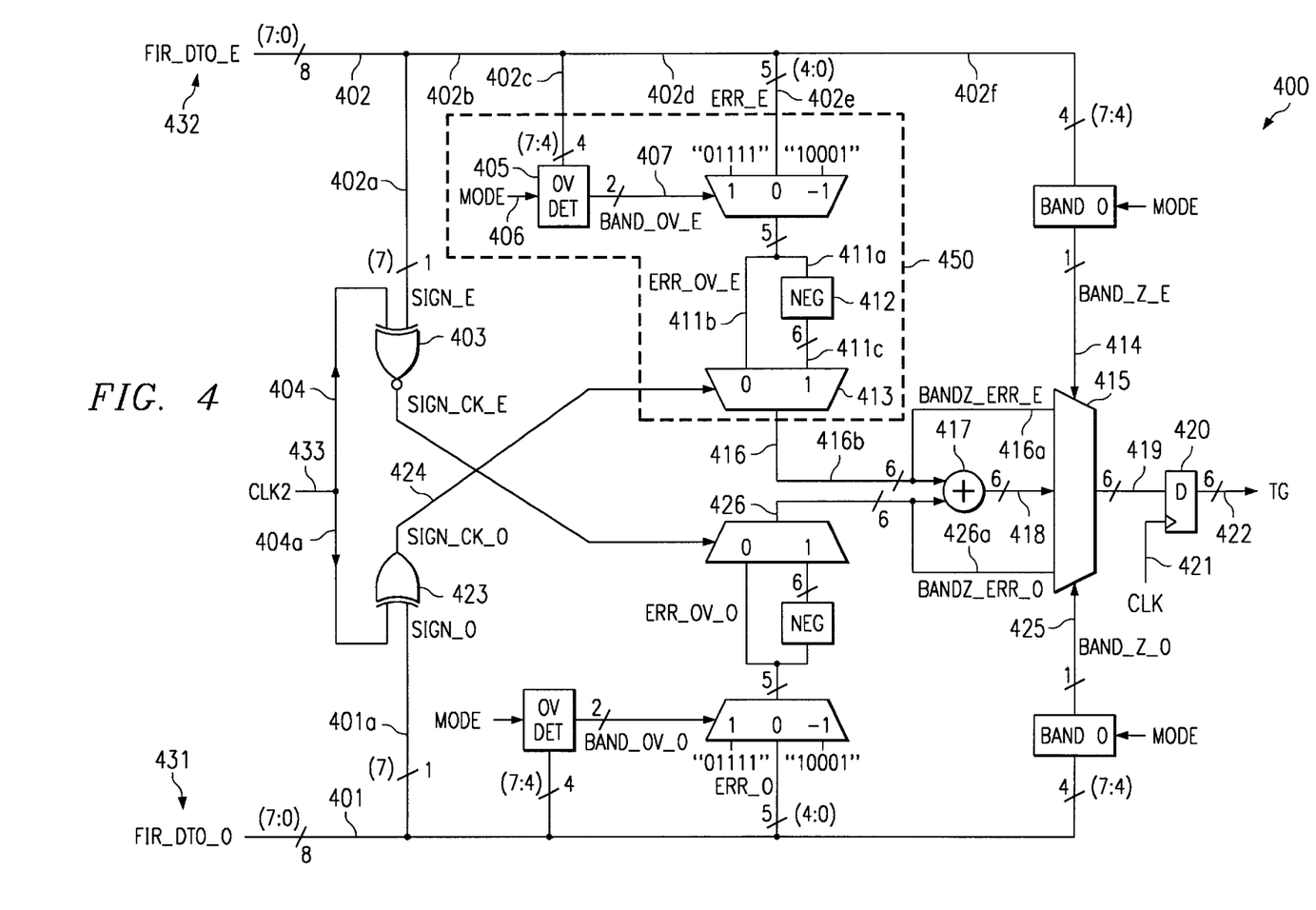
FIG. 4 is a detailed diagram of the data-tracking mode of FIG. 2.

FIG. 4 depicts a preferred embodiment of the present invention operating in data-tracking mode. Note that, for a preferred embodiment of the present invention, 8-bit (7:0) EVEN and ODD bit streams are used in this mode for reasons detailed in U.S. patent application Ser. No. 09/256,568 Attorney's Docket No. TI-28614, supra. To enable comparison with FIG. 3 as well as for simplicity's sake, the differences between FIR-bypass mode FIG. 3 and data-tracking mode FIG. 4 will be highlighted.

The first difference has already been noted between FIR-bypass mode and data-tracking mode. An additional 2 bits have been added to the ODD and EVEN bit streams FIR_DTO_O input to data-tracking mode timing gradient circuit 400 FIG. 4 on path 401 FIG. 4 and FIR_DTO_E input on path 402 FIG. 4, respectively, after processing in the filter (not shown in FIG. 4). This enables FIR_DTO_O 431 FIG. 4 and FIR_DTO_E 432 FIG. 4 to be described with sufficient accuracy for subsequent use in the installed system, for example, a read channel of a mass data storage device. Other differences between the FIR-bypass mode of FIG. 3 and data-tracking mode of FIG. 4 are highlighted for one-half of the symmetric circuit, with the understanding that the other half of the circuit of FIG. 4 mirrors the first described one-half in a manner similar to that of FIG. 3.

Viewing the top half of FIG. 4, i.e., the EVEN bit stream, FIR_DTO_E 432 FIG. 4 on path 402 FIG. 4 is processed on path 402a FIG. 4 in the same manner as for FIR-bypass mode of FIG. 3, i.e., an MSB is provided for determining the sign at XOR gate 403 FIG. 4 together with signal CLK2 433 FIG. 4 provided on path 404 FIG. 4. Note XOR gates 403 and 423 FIG. 4 are used only when there is internal parallelism, i.e., if you use the parallel structure of FIG. 1a they are not present. Following path 402 FIG. 4 to 402b FIG. 4, however, four MSBs of the 7 remaining bits of signal FIR_DTO_E 432 FIG. 4 are provided to overflow detection circuit OVDET 405 FIG. 4. Also provided to OVDET 405 FIG. 4 is a semi-static control signal MODE (e.g., PR4 vs. EPR4 selection) from an external controller (not shown in FIG. 4) on path 406 FIG. 4. The 2-bit signal BAND_OV_E is output from OVDET 405 FIG. 4 on path 407 FIG. 4 as an input to "full" multiplexer 408 FIG. 4, i.e., multiplexer 408 FIG. 4 is capable of handling bit values 1, 0, and −1.

On paths 402, 402b, 402d and 402e FIG. 4, a single bit of FIR_DTO_E 432 FIG. 4 of the 4-bit remaining signal is provided as signal ERR_E to multiplexer 408 FIG. 4 for selection by the control signal BAND_OV_E, provided on path 407 FIG. 4. Note the binary designators "01111" (selected through the value of +1) and "10001" (selected through the value of −1) in multiplexer 408.

Output from multiplexer 408 FIG. 4 is provided as a 5-bit signal on path 411a FIG. 4 to circuit NEG 412 FIG. 4 where it is negated and passed on path 411c FIG. 4 as a "signed" 6-bit signal to a simple multiplexer 413 FIG. 4. Also provided to multiplexer 413 FIG. 4 is a 1-bit signal SIGN_CK_O over path 424 FIG. 4. SIGN_CK is generated as described in FIG. 3, i.e., processing a 1-bit signal SIGN_O sent along path 401a FIG. 4 with a signal CLK2 433 FIG. 4 sent along path 404a FIG. 4 to XOR gate 423 FIG. 4, with SIGN_CK_O being the output of XOR gate 423 FIG. 4. Output from multiplexer 408 FIG. 4 is also sent directly to multiplexer 413 FIG. 4 as error and band overflow 5-bit signal ERR_OV_E on path 411b FIG. 4.

Signal FIR_DTO_E 432 FIG. 4 is further provided as the 4 MSBs of signal FIR_DTO_E over paths 402, 402b, 402d, and 402f FIG. 4 to a separate band Band Zero (BO) detector 409 FIG. 4 for processing after the high-speed portion has been accomplished. The description and operation of circuit BO 409 FIG. 4 is fully described in U.S. patent application Ser. No. 09/322,671 and U.S. Pat. No. 6,191,716 Attorney's Docket No. TI-28902, supra. Also provided to circuit BO 409 FIG. 4 on path 410 FIG. 4 is signal MODE from an external controller (not shown in FIG. 4) having the same function as signal MODE placed on path 406 FIG. 4 as described above.

Output from BO circuit 409 FIG. 4 is provided as a 1-bit signal BAND_Z_E over path 414 FIG. 4 to multiplexer 415 FIG. 4. Also provided directly to multiplexer 415 FIG. 4 is a 6-bit signal BANDZ_ERR_E over paths 416 and 416a FIG. 4 from multiplexer 413 FIG. 4. Over paths 416 and 416b FIG. 4 signal BANDZ_ERR_E is provided to summer 417 FIG. 4 where it is combined with signals from "mirror" processing of the ODD bit stream FIR_DTO_O 431 FIG. 4 (starting as an 8-bit signed signal at path 401 FIG. 4). From summer 417 FIG. 4, the summer's output is transmitted over path 418 FIG. 4 for processing in multiplexer 415 FIG. 4 with signals BAND_Z_E from path 414 FIG. 4 and BANDZ_ERR_E from paths 416 and 416a FIG. 4, as well as the mirror signals BAND_Z_O from path 425 FIG. 4 and BANDZ_ERR_E from paths 426 and 426a FIG. 4.

From multiplexer 415 FIG. 4 a 6-bit signal is sent to register 420 FIG. 4 over path 419 FIG. 4. Also input to register 420 FIG. 4 is clock signal CLK, at the full period T, over path 421 FIG. 4. Signal TG FIG. 4 is provided as a 6-bit output for use in a timing recovery loop or PLL (not shown in FIG. 4). Note that this signal has been processed so that not only will the timing gradient control the timing recovery but also match the proper band of operation in the case where more than one PRML architectures is implemented, e.g., PR4 and EPR4, in a single system such as a read channel of a mass data storage device.

Figure 5:
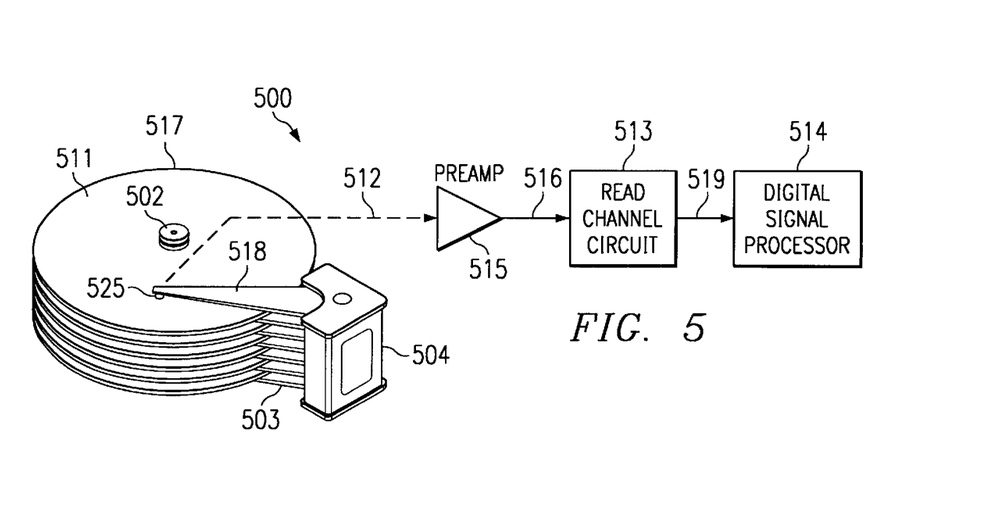
FIG. 5 is a block diagram of a disk drive and its read channel circuit, together with inputs and outputs therefrom.

FIG. 5 is a diagram of parts of a mass data storage device 500, including part of its read circuitry 513 FIG. 5. The hard disk drive 501 FIG. 5 contains several magnetic disks 511 FIG. 5, each containing data on its magnetic surface 517 FIG. 5 and each associated with an arm 503 FIG. 5 controlled by a voice coil motor 504 FIG. 5, the arms being connected to spindle 502 FIG. 5 that is rotated by a spindle motor (not shown). At the outer end of each arm 503 FIG. 5 is a read/write head 505 FIG. 5 for reading from and writing to the disks 511 FIG. 5. A magnetic disk output signal 512 FIG. 5 from read/write head 505 FIG. 5 is input to a preamp 515 FIG. 5 that, in turn outputs amplified signal 516 FIG. 5 to read channel circuit 513 FIG. 5. The output signal is transmitted on path 519 FIG. 5 from the read channel circuit 513 FIG. 5 to a controller or digital signal processor 514 FIG. 5. A preferred embodiment of the present invention is contained within the read channel circuitry 513 FIG. 5.

Figure 6:
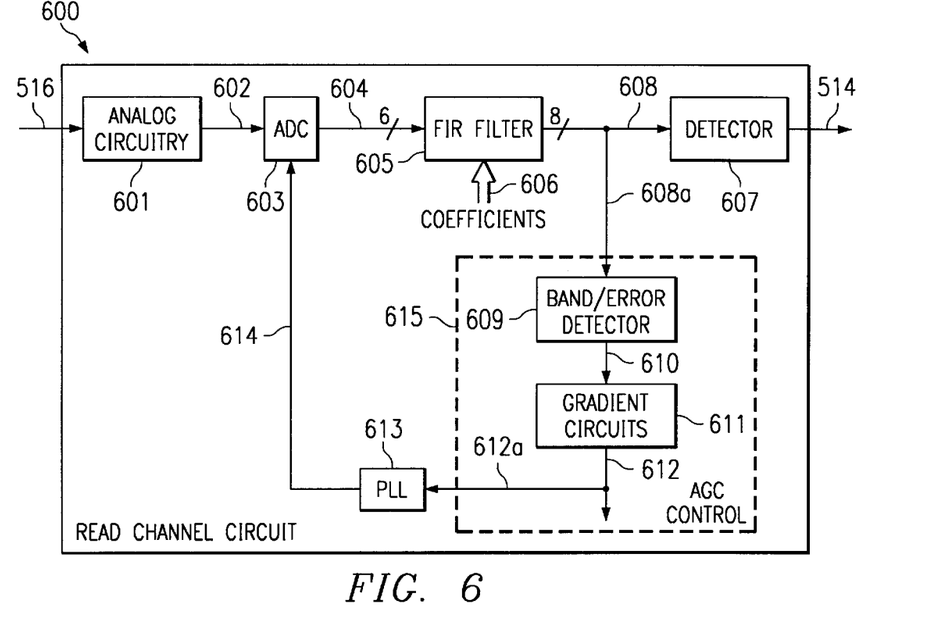
FIG. 6 depicts a block diagram preferred embodiment of the present invention as it is installed in a read channel circuit of a disk drive.

FIG. 6 shows the read channel circuit 600 (513 in FIG. 5) in more detail. The circuitry 400 of FIG. 4 is shown included in the dotted box as 615 FIG. 6. Shown as input to read channel circuitry 600 FIG. 6 is the output signal 516 FIG. 6 of preamp 515 FIG. 5 that conditioned the read signal 512 FIG. 5 from the disk 511 (FIG. 5). Analog circuitry 601 FIG. 6 is available for gain control and signal conditioning during signal processing within read channel circuitry 600 FIG. 6. A conditioned analog signal is provided on path 602 FIG. 6 from analog circuitry 601 FIG. 6 to an analog-to-digital converter (ADC) 603 FIG. 6. A preferred embodiment includes a 6-bit digital signal output from ADC 603 FIG. 6 on path 604 FIG. 6 to a filter 605 FIG. 6 having taps (not shown) each associated with a coefficient 606 FIG. 6 provided by a source (not shown) external to the read channel circuitry 600 FIG. 6. An 8-bit filtered digital output signal is provided on path 608 FIG. 6 to a detector 607 FIG. 6 for output on path 514 FIG. 6 (also see FIG. 5) to the digital signal processor (not shown). In a preferred embodiment, a second path 608a FIG. 6 is provided for feedback control purposes to feedback control processing circuitry 615 FIG. 6, first to a band/error detector 609 FIG. 6, the output of which is provided on path 610 FIG. 6 to a gradient circuit 611 FIG. 6 containing a timing gradient circuit for processing of EVEN and ODD bit streams of the output signal from band/error detector 609 FIG. 6.

Also included in gradient circuit 611 FIG. 6 is a gain gradient circuit (not separately shown in FIG. 6) for output to an automatic gain control (AGC) circuit over path 612 FIG. 6. The output signal from the timing gradient circuits (not separately shown within block 611 FIG. 6) is sent on path 612a FIG. 6 to PLL 613 FIG. 6. From PLL 613 FIG. 6, a feedback control, or adjustment, signal is sent over path 614 FIG. 6 to ADC 603 FIG. 6.

Figure 7:
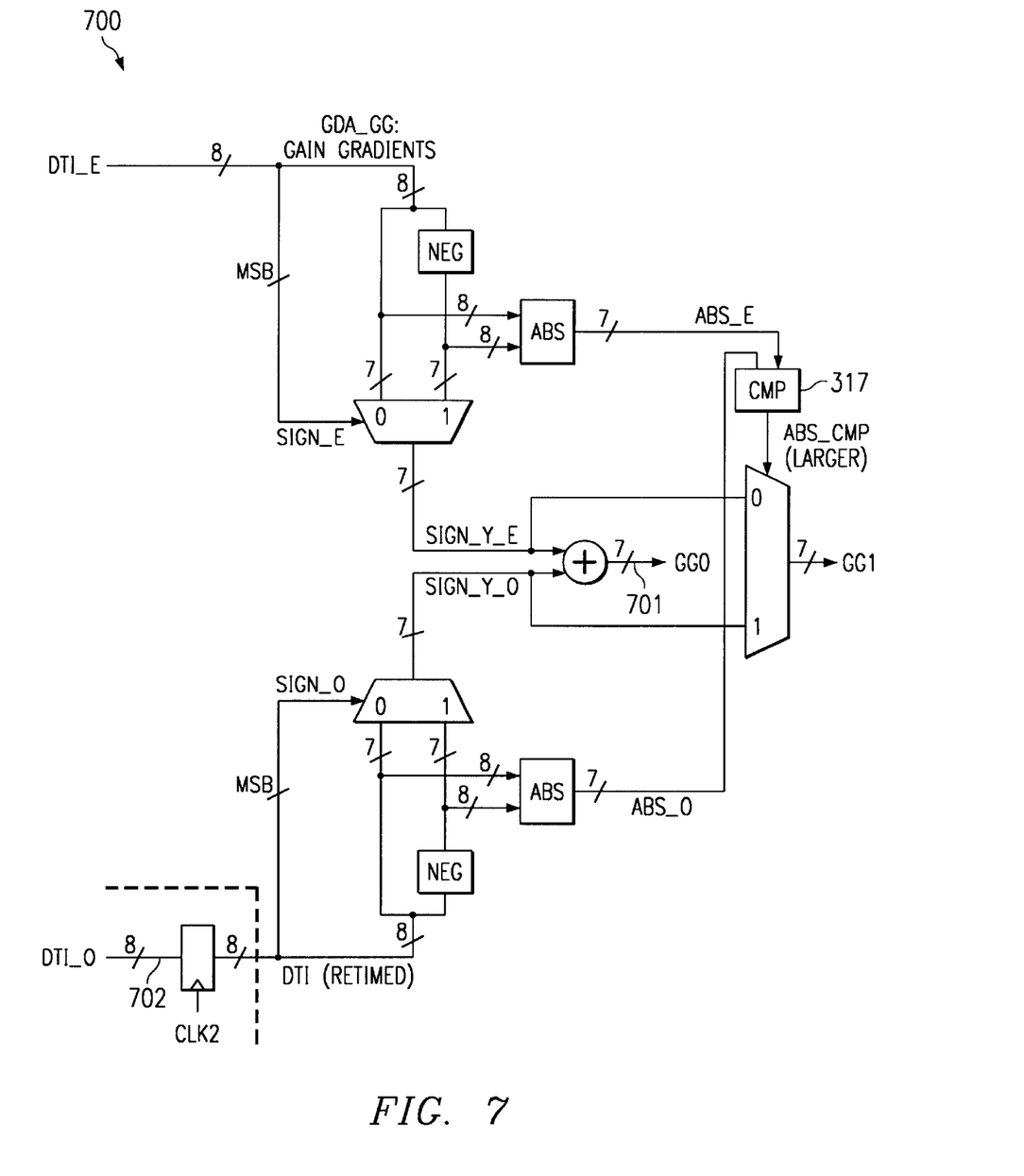
FIG. 7 depicts a gain gradient circuit very similar to that of the timing gradient circuit shown in FIG. 3.

FIG. 7 provides a detailed diagram of a gain gradient circuit employed in preamble acquisition mode. Note the similarities between FIG. 7 and FIG. 3. Except for the XOR 303 and $\overline{XOR}$ 325 gates of FIG. 3, and the re-timing of only one input signal DTI_O on path 702 of FIG. 7, the circuits are identical. This is readily seen when comparing the equations for the output signals (provided for illustration not and not as a limitation) $TG_0$ Eqn (3) on path 327 in FIG. 3 and $GG_0$ Eqn. (4) on path 701 of FIG. 7:

(PR4 timing gradient)

$$TG_0(k)=S(k)\times Y(k-1)-S(k-1)\times Y(k) \quad (3)$$

(PR4 gain gradient)

$$GG_0(k)=S(k)\times Y(k)+S(k-1)\times Y(k-1) \quad (4)$$

Equations (3) and (4) are similar so that the necessary circuitry to carry them out is similar. Thus it can be seen that the method and system for implementing a preferred embodiment of the present invention is applicable to any gradient circuit.

Figure 8:
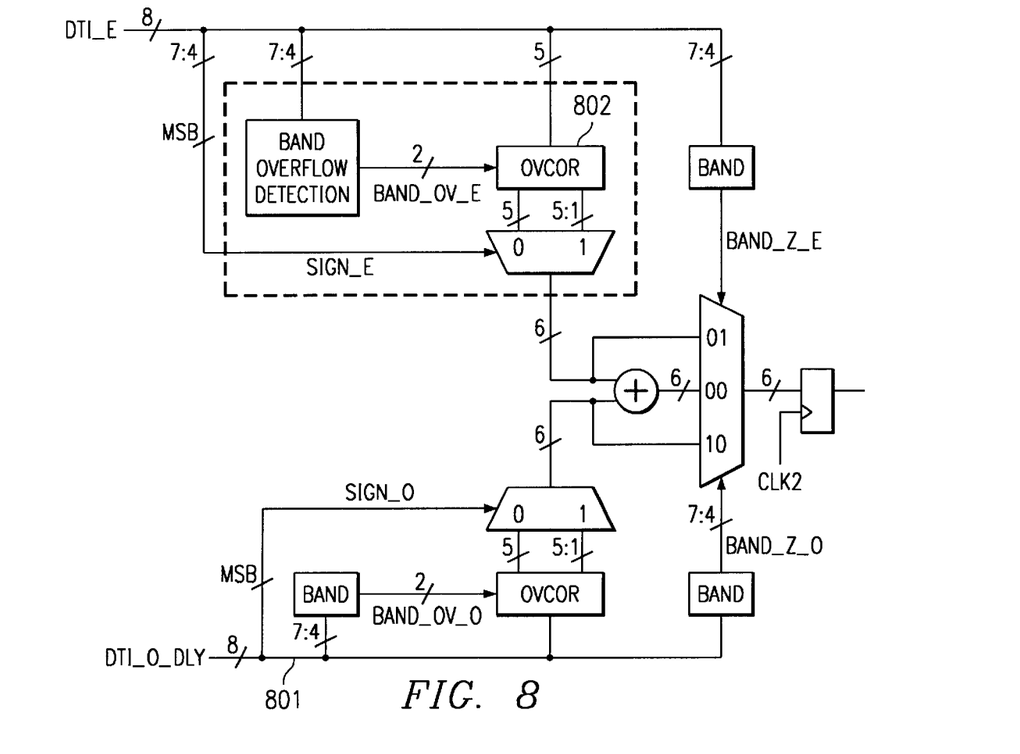
FIG. 8 depicts a gain gradient circuit very similar to that of the timing gradient circuit shown in FIG. 4.

Similarly, compare FIG. 8, a gain gradient circuit operating in the data-tracking mode. Note the same re-timing as with FIG. 7 of the odd bit stream DTI_O_DLY on path 801 FIG. 8 and the same absence of XOR 303 and $\overline{XOR}$ 325 gates of FIG. 3. The other difference between a gain gradient circuit in data-tracking mode and a timing recovery circuit lies in the simpler overflow circuitry 802 FIG. 8 as compared to overflow circuitry 450 FIG. 41 of timing gradient circuit 400 FIG. 4. Individual signals introduced in the above discussion have been described in detail in U.S. patent application Ser. No. 09/256,568, U.S. patent application Ser. No. 09/247,131 and U.S. Pat. No. 6,252,733 and U.S. patent application Ser. No. 09/258,827, and U.S. patent application Ser. No. 09/322,671 and U.S. Pat. No. 6,191,716, supra.

The foregoing describes the salient features of the present invention's parallel structure and modified architecture, and should not be interpreted as limiting the application of, method of operation, or uses for the present invention to that specified in the foregoing. While the invention has been shown with specific components and circuits, and further described with regard to specific signal compositions, it will be understood by those skilled in the art that various other changes in the selection of components and use with different combinations of circuit components, or other details may be changed without departing from the spirit and scope of the invention.

I claim:

1. An architecture for processing a digital feedback control signal, resulting from processing an incoming signal, having a bit rate frequency, and a separate timing reference signal, the processed feedback signal controlling a synchronization circuit, comprising:

parallel paths, having stages, for processing the digital feedback signal; and a structure facilitating cross-referenced processing between said parallel paths, wherein the processing on each of said paths is done at half the bit rate frequency of the incoming signal;

wherein said structure employs:

an XOR gate on one of said paths and an $\overline{XOR}$ gate on the other of said paths;

an overflow detection circuit in each of said paths;

an error detection circuit, having an output, in each of said paths;

a band and overflow detection circuit, having an output, in each of said paths;

a summer, having an output, for summing said outputs from each of said error detection circuits;

a multiplexer, having an output, for processing outputs from each of said error detection circuits, said summer, and each of said band and overflow circuits;

a reference clock, having an output; and a register for processing said outputs from said multiplexer and said reference clock into a control signal for a timing recovery circuit.

2. A system for processing a digital feedback control signal, resulting from processing an incoming signal, having a bit rate frequency, and a separate timing reference signal, the processed feedback signal controlling a synchronization circuit, comprising:

parallel paths, having stages, for processing the digital feedback signal; and a structure facilitating cross-referenced processing between said parallel paths, wherein the processing on each of said paths is done at half the bit rate frequency of the incoming signal;

wherein said structure employs:

an XOR gate on one of said paths and an $\overline{XOR}$ gate on the other of said paths;

an overflow detection circuit in each of said paths;

an error detection circuit, having an output, in each of said paths;

a band and overflow detection circuit, having an output, in each of said paths;

a summer, having an output, for summing said outputs from each of said error detection circuits;

a multiplexer, having an output, for processing outputs from each of said error detection circuits, said summer, and each of said band and overflow circuits;

a reference clock, having an output; and a register for processing said outputs from said multiplexer and said reference clock into a control signal for a timing recovery circuit.

3. A method for processing a digital feedback control signal, resulting from processing an incoming signal, having a bit rate and a separate reference signal, the processed feedback control signal controlling a synchronization circuit, comprising:

deploying parallel paths A and B of operation; and processing the signal on each path while using operations that cross-reference each of said paths to the other of said path;

wherein said method comprises:

employing an XOR gate on one of said paths and an $\overline{\text{XOR}}$ gate on the other of said paths so as to provide a clocked reference from said path A to said path B and a clocked reference from said path B to said path A;

employing an overflow detection circuit in each of said paths;

employing an error detection circuit, having an output, in each of said paths;

employing a band and overflow detection circuit, having an output, in each of said paths;

summing said outputs from each of said error detection circuits in a summer, having an output;

processing outputs from each of said error detection circuits in a multiplexer, having an output, said summer, and each of said band and overflow circuits;

providing a reference signal from a clock; and processing said outputs from said multiplexer and said reference clock into a control signal for the synchronization circuit.

* * * * *